United States Patent

[11] 3,622,670

[72] Inventor Richard A. Edgren
       Berwyn, Pa.
[21] Appl. No. 852,447
[22] Filed Aug. 22, 1969
[45] Patented Nov. 23, 1971
[73] Assignee American Home Products Corporation
       New York, N.Y.

[54] METHOD OF INDUCING OVULATION
    4 Claims, No Drawings
[52] U.S. Cl. .................................................. 424/238,
                                            424/241, 424/243
[51] Int. Cl. ........................................................ A61k 17/06
[50] Field of Search ............................................ 424/238,
                                                       241, 243

[56]           References Cited
           OTHER REFERENCES

Edgren, R. A. Proc. Soc. Exp. Biol. Med. 92: 569– 571 (1956) " Notes on Impeded Estrogens"

Docke, F., et al. ZBL. Gynaek. 88: 273– 282 Mar. 1966 " Animal Experimental Studies on Triggering of Ovulation with Gonadotropins and Estrogens"

Foukas, M., ZBL. Gynaek. 88: 1578– 82 Nov. 1966 " On the Potentiating Effect of Estrogen on the Stimulation of Absent Ovulation"

Docke, F. et al., ZBL. Gynaek 89: 1130– 5 1967 " Experimental Studies of the Induction of Ovulation by Gonadotropins and Estrogens"

Tani T. et al. J. Jap. Obstet. Gynec. Soc. 19: 1349– 57, Nov. 1967 " Basic and Clinical Studies on the Effects of Estrogen on Pituitary Luteinizing Hormone Excretion"

*Primary Examiner*—Shep K. Rose
*Attorneys*—Edmund H. O'Brien and Joseph Martin Weigman ABSTRACT: Compositions comprising 13-alkyl-16α-hydroxy-3,17-dioxygenated-gona-1,3,5(10)-trienes, especially 13-ethylgona-1,3,5(10)-triene-3,16α,17β-triol, and a carrier are useful to induce ovulation in warm-blooded anovulatory vertebrates after administration.

METHOD OF INDUCING OVULATION

This invention relates to a method for inducing ovulation in warm-blooded anovulatory vertebrates, e.g., female animals. More particularly, it is concerned with the administration of selected 13-alkyl-16α-hydroxy-3,17-dioxygenated-gona-1,3,5(10)-trienes as a means of inducing such vertebrate to ovulate and, ultimately, to conceive.

BACKGROUND OF THE INVENTION is is a matte of common knowledge and experience to administer nonsteroidal, impeded estrogens such as clomiphene citrate to treat infertility due to anovulation. It is known that ovulation depends on having a proper balance of pituitary hormones to cause the ovary to shed an egg. Thus, exogenous pituitary gonadotrophins can be employed also to cure infertility, in some cases. However, these prior art approaches are not uniformly effective and clinical exploitation of the unique properties of the nonsteroidal impeded estrogens has been limited. For example, early studies with clomiphene for the long term have been marred by a high incidence of ovarian cysts. This has caused some users to prefer repetitive short term therapy in patients with secondary problems. The gonadotrophins are not too useful because of high cost and lack of uniform results. It is now surprisingly been found possible to obtain a very beneficial effect on fertility without causing such problems if an impeded steroidal estrogen is administered to infertile vertebrates.

While the reasons for their effectiveness in the treatment of infertility are not clearly understood at this time, it appears that a family of 13-alkyl-16α-hydroxy-3,17-dioxygenated-gona-1,3,5(10)-trienes, by virtue of impeded estrogenic effects, function apparently by inducing the release of endogenous pituitary gonadotrophic hormones. This finding, therefore, permits the administration of compositions comprising such compounds and a carrier to induce ovulation in a more highly effective manner and with fewer side effects than observed in prior art methods.

DESCRIPTION OF THE INVENTION

These valuable objective and all other advantages that would be apparent to those skilled in the art are readily achieved by practice of the instant invention which is, in essence: a method of inducing ovulation in a warm-blooded anovulatory vertebrate which comprises the administration thereto of a composition comprising a 13-alkyl-16α-hydroxy-3,17-dioxygenated-gona-1,3,5(10)-triene and a pharmacologically-acceptble carrier, the amount of said composition administered being at least sufficient to induce ovulation.

Special mention is made of several embodiments:

A method as first above defined, wherein said composition is administered as a dosage unit comprising a major amount of a pharmacologically-acceptable carrier and from about 1.0 to about 200 mg. of said compound;

a method as first above defined, wherein said compound is of formula I:

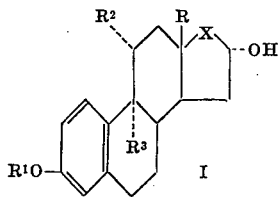

wherein R is (lower)alkyl;
R$^1$ is hydrogen or (lower)alkyl;
R$^2$ and R$^3$ are hydrogen or hydroxy; and
X is carbonyl, hydroxymethylene dr ethylenedioxy
A method as next above defined, wherein in said compound R is ethyl, R$^1$, R$^2$ and R$^3$ are hydrogen and X is hydroxymethylene.

When used herein and in the appended claims, the term "warm-blooded anovulatory vertebrates" contemplates female animals and birds such as mice, rats, guinea pigs, rabbits, monkeys, gibbons, langurs, chickens, and the like and valuable domestic animals and birds, such as dogs, cats, rabbits, sheep, cattle, horses, chickens, turkeys and the like, of such an age that ovulation is feasible and normal but in which ovulation has been interrupted by an improper balance of pituitary hormones to such a degree that the ovary fails to shed an egg. The term "inducing ovulation" contemplates a mechanism whereby the vertebrate is caused to produce an egg ky shedding from its ovary(ies) because the necessary balance of pituitary hormones has been remedied. In essence, ovulation is induced by administration of an agent which induces the release of the endogenous pituitary gonadotrophic hormones involved in ovulation, particularly, the luteinizing hormone; this release is characterized by a significant reduction in the pituitary luteinizing hormone (LH) content and increase in serum concentration of this substance. In these circumstances a favorable environment for effecting ovulation is achieved. Merely by way of illustration, these functions are performed by administration of an impeded estrogenic agent, e.g., a 13-alkyl-16α-hydroxy-3,17-dioxygenated-gona-1,3,5(10)-triene, and especially, 13-ethylgona-1,3,5(10)-triene-3,16α17β-triol.

The term "pharmacologically-acceptable carrier" includes solid and liquid carriers and contemplates usual and customary substances employed to formulate unit dosages for pharmacological purposes. It will also include in its broadest aspects animal feedstuffs.

The term "(lower)alkyl" contemplates alkyl groups from about one to 10 carbon atoms, straight chain and branched, illustrative members of which are methyl, ethyl, n-propyl, i-propyl, n-butyl, t-butyl, n-pentyl, n-hexyl, cyclopentyl, n-octyl, n-nonyl, n-decyl, and the like.

TO formulate unit dosages for administration according to this invention the active ingredient can be compounded into dosage forms, such as tablets, capsules and the like. This is done by combining the active ingredient with conventional carriers, such as magnesium carbonate, magnesium stearate, talc, sugar, lactose, pectin, dextrin, starch, gelatin, tragacanth, methyl cellulose, sodium carboxymethyl cellulose, low melting wax, cocoa butter, and the like. Dlluents, flavoring agents, solubilizers, lubricants, suspending agents, binders, tablet-disintegrating agents, and the like may be employed. The active ingredient can be formulated with an encapsulating material with or without other carriers. In all cases, the proportion of active ingredient in the said compositions will be at least sufficient to impart ovulatory inducing activity thereto on administration. This will range upward from about 0.001 percent by weight of active ingredient in said composition. As is mentioned above the amount of active ingredient to be used for each unit dosage (tablet or capsule) is from about 1.0 to about 200 mg. of active ingredient, preferred amounts being 25, 50 and 100 mg. for example.

The "active ingredients" contemplated by this invention are 13-alkyl-16α3,17-dioxygenated-gona-1,3,5(10)-trienes, specifically the 13-alkyl-16α-hydroxy- 3,17-dihydroxygona-1,3,5-(10)-trienes and the 17-keto and ketalized and 11- and 9-hydroxylated analogs thereof of formula I hereinabove, which can be prepared by procedures well within the capabilities of those skilled in the art. For example, they can be prepared by either (a) epoxidizing a compound having a 17-acyloxy-13-alkylgona-1,3-5(10),16-tetraene nucleus; or (b) oxidizing a compound having a 17-acyloxy-13-alkylgona-1,3,5(10),16-tetraene nucleus by hydroboration followed by mild oxidative hydrolysis of either intermediate to obtain as a product a compound having a gona-1,3,5(10)-triene-16,17-trans-diol nucleus; or (c) 16-oximating a compound having a 13-alkylgona-1,3,5(10)-triene-17-one nucleus (U. K. Pat. No. 1,010,051) to obtain as a product a compound having a 16-oximino-13-alkylgona-1,3,5(10)-triene-17-one nucleus and subjecting said product to reductive hydrolysis. These methods and conditions as well as conditions useful to prepare the ketal, keto and hydroxy analogs contemplated as active ingredients are described in copending application, Ser. No. 534,353, filed Mar. 15, 1966, the disclosure of which is incorporated herein by reference, and in British Pat Nos. 1,115,954 and 1,115,956. Detailed procedures for the preparation of exemplary active ingredients contemplated by this invention will be given hereinafter.

As is mentioned hereinabove, the instant active ingredients possess a marked ability to affect the amount of circulating gonadotrophic hormones. Their use is accompanied by a minimum of side effects such as ovarian cysts and the like, such as have been observed following the use of currently available agents.

One pharmacological test in which the effect of orally administrated active ingredients on pituitary and circulating gonadotrophins is demonstrated was as follows:

13-ethylgona-1,3,5(10)-triene-3β,16α, 17β-triol at doses of 1, 10, 100 and 1,000 μg./rat were administered by gavage, daily for 14 days to adult rats. At autopsy, the following effects were observed: body weights were not altered. Anterior pituitary weights were slightly (ca. 10 percent) but significantly increased by 10 and 100 μg of 13-ehtylgona-1,3,5(10)-triene-3β,-16α,17β-triol. An increase was observed at 1,000 μg, but one increase was not statistically significant. No significant changes in ovarian weight were noted, although the lowest weights were noted in the 1,000 μg group. A statistically significant reduction in uterine weight was observed at the highest dose of 13-ethylgona-1,3,5(10)-triene-3β,16α17β-triol. Statistically significant increases in pituitary FSH content were seen in the 1 μg and the 1,000 μg groups, while the increase of FSH in the 100 μg group was not of significant magnitude to be statistically significant. A reduction of FSH content was noted in the 10 μg group, for reasons which are not apparent. Serum FSH levels were undetectable in all groups including the oil controls. Pituitary LH concentration was inversely proportional to the dose of 13-ethylgona-1,3,5(10)-triene-3β,16α, 17β-triol, the concentration of the 1,000 μg group being less than 50 percent (p<.025) of the oil control value. The serum LH concentration was directly proportional to the 13-ethylgona-1,3,5(10)-triene-3β,16α, 17β-triol dose.

These findings indicate that following cessation of 13-alkylgona-1,3,5(10)-triene-3β,16α,17β-triol treatment for 14 days, pituitary FSH content was increased, pituitary LH content was significantly reduced and serum LH was increased. These data indicate the release of LH from the pituitary into the blood, providing a favorable environment for effecting ovulation.

The following procedures illustrate the preparation of active ingredients employed in the instant methods and compositions

PROCEDURE A

13β-Ethylgona-1,3,5(10)-triene-3,16α,17β-triol

Add 3,17-diacetoxy-16α17α-epoxy-13β-ethylgona-1,3,5(10)-triene (U.K. Pat. No. 1,115,956, example 1, 0.112 g.) in dry ether (14 ml.) and benzene (4.0 ml.) to a solution of lithium aluminum hydride (0.154 g.) in ether (10 ml.), stir at 20° C. for 3 hours and then allow to stand for 16 hours. Decompose excess reagent by the cautious addition of ethyl acetate (1.0 ml.), add 2N hydrochloric acid (50 ml.) and extract with ethyl acetate. Wash, dry and evaporate the organic solution and recrystallize the residue from ethanol at 0° C. to give the solvated title compound (0.082 g.) m.p. 231.5°–234° C. Exhaustively dry a sample at 80° C./1 mm. for 48 hours to obtain material m.p. 258°–260° C.

PROCEDURE B

Alternative Procedure

13β-Ethylgona-1,3,5(10)-trien-3,16α, 17β-triol

Add 3-acetoxy-13β-ehtylgona-1,3,5(10)-trien-16α-ol-17-one (1.33 g.) in benzene (50 ml.) and ether (200 ml.) to a stirred suspension of lithium aluminum hydride (2.01 g.) in ether (150 ml.) Stir at 20° C. for 5 hours and then allow to stand at 20° C. for 16 hours. Destroy excess reagent by adding ethyl acetate (15 ml.). Add more ethyl acetate (150 ml.) and shake with 2N hydrochloric acid (750 ml.). Separate the organic layer, extract the aqueous solution with ethyl acetate (3×200 ml.) and wash the combined organic solution with brine and dry. Evaporate the solvent and recrystallize twice from ethanol to obtain the title compound (0.6 g.) m.p 230°–232° C.

PROCEDURE C

13β-Ethyl-3-methoxygona-1,3,5(10)-trien-16α, 17β-diol

Add 17β-acetoxy-16α,17α-epoxy-13β-ehtyl-3-methoxygona-1,3,5(10)-triene (6.0 g.) in ether (150 ml.) dropwise to a stirred suspension of lithium aluminum hydride (3.0 g.) in ether (50 ml.), stir for 2 hours and then leave at 20° C. for 18 hours. Decompose excess reagent by adding a mixture of ethyl acetate and ether (1:9) followed by 2N hydrochloric acid (1.0 l.). Extract with ethyl acetate and wash the organic solution with brine, dry and concentrate to a volume of 100 ml. Allow the solution to stand, filter the precipitate and dry to obtain the title compound (2.7 g.) m.p. 188.5°–192° C.

PROCEDURE D

13β-Ethyl-3-methoxygona-1,3,5(10)-trien-16α-ol-17-one

Treat 17-acetoxy-13β-ethyl-16α,17α-epoxy-3-methoxygona-1,3,5(10)-triene (3.6 g.) in methanol (500 ml.) with 6N sulfuric acid (75 ml.) and stir the mixture at 25° C. for 4 days. Reduce the solution to a small volume, in vacuo, add water and cool the mixture in an ice bath. Filter the precipitate, wash with water, and dry to obtain the title compound (2.98 g.) m.p. 130°–138° C. homogeneous by thin layer chromatography; infrared absorption peaks at 2.95, 3,45, 3,53, 5.76, 6.21, 6.37, 6.67 μ.

PROCEDURE E

Alternative Procedure

13β-Ethyl-3-methoxygona-1,3,5(10)-trien-16α,17β-diol

Dissolve 13β-ethyl-3-methoxygona-1,3,5(10)-trien-17β-ol-16-one (0.1 g.) in ethanol (20 ml.), treat with sodium borohydride (0.3 g.) and allow the mixture to stand at 25° C. for 3 hours. Acidify the mixture with acetic acid, add water and extract with ether. Wash the ethereal solution with aqueous sodium bicarbonate, water and dry. Evaporate the solvent and recrystallize the residue from ethanol to obtain the title product. m.p. 186°–188° C.

PROCEDURE F

13β-Ethyl-17,17ethylenedioxy-3-methoxygona-1,3,5(10)-trien-16α-ol

Reflux 13β-ethyl-3-methoxygona-1,3,5(10)-trien-16α-ol-17-one (3.46 g.) with p-toluenesulfonic acid (0.6 g.) in ethylene glycol (65 ml.) and toluene (120 ml.) for 68 hours with continuous removal of water. Wash the cooled solution with sodium bicarbonate solution, water, dry, and evaporate. Dissolve the residue in benzene (30 ml.) and chromatograph on fluorosilicate (75 g.), eluting with petroleum ether and petroleum ether-benzene mixtures. Combine the later fractions and recrystallize twice from methanol to obtain the title compound (0.54 g.) m.p. 163°–165° C., infrared absorption peaks at 2.93, 3.52, 6.22, 6.34, 6.66, 8.07 μ.

$C_{22}H_{30}O_4$ Calculated: C, 73.71; H, 8.44 percent
Found: C, 73.86; H, 8.41 percent

PROCEDURE G

13β-Ethylgona-1,3,5(10)-triene-3,11α,16α,17β-tetrol

Heat a mixture of 13β-ethyl-3-acetoxygona-1,3,5(10),9(11)-tetraen-17-one (2.04 g.) and p-toluenesulfonic acid (0.6 g.) in isopropenyl acetate (50 ml.) on a steam bath and remove portions (2×3 ml.) of solvent by distillation after 2 and 4 hours and then maintain the mixture at 100° C. for 16 hours. Reduce the volume (to about 20 ml.) by slow distillation through a short column over a period of 6 hours under a pressure of 600 mm. Add ether (70 ml.) to the cooled solution and wash with aqueous potassium bicarbonate, brine and dry. Evaporate the solvent, dissolve the residue in benzene and chromatograph on fluorosilicate (150 g.), eluting with benzene 990 ml.) to obtain a colorless oil (0.23 g.) and then with benzene (2 l.) and benzene-ether (200 ml.; 49:1) to obtain 13β-ethylgona-1,3,5(10),9(11),16-pentaene-3,17-diol, diacetate (1.17 g.) m.p. 150°–151° C. after purification from ethanol.

$C_{23}H_{26}O_4$ Calculated: C, 75.38; H, 7.15 percent
Found: C, 75.41; H, 7.19 percent.

Dissolve this pentaene (3.95 g.) in dry tetrahydrofuran (150 ml.) and through the solution bubble diborane (generated by adding 1.24 g. of sodium borohydride in 30 ml. of diethyleneglycol dimethyl ether to 10 ml. of boron trifluoride etherate in 20 ml. of diethylene glycol dimethyl ether) over a period of 2 hours and then allow to stand at 20° C. for 16 hours. Add water (20 ml.) cautiously to decompose excess reagent, and then treat the resulting solution with hydrogen peroxide (30 ml.; 100 volume) and aqueous 2N sodium hydroxide (42 ml.). Reflux for 30 minutes, evaporate the tetrahydrofuran under reduced pressure, and acidify the resulting aqueous solution with concentrated hydrochloric acid (10 ml.) Extract with ethyl acetate and wash the organic solution with aqueous potassium bicarbonate nd brine, dry and evaporate the solvent. Triturate the residue with hot acetone, cool and filter to obtain the title compound (1.09 g.) m.p. 249°–254° C. Dec. Recrystallize from ethanol to raise the melting point to 256°–258° C.

$C_{19}H_{26}O_4$ Calculated: C, 71.67; H, 8.23 percent
Found: C, 71.79; H, 8.14 percent.

PROCEDURE H

13β-Ethylgona-1,3,5(10)-trien-3,9α,16α,17β-tetrol

Chromatograph the material from the mother liquors of the acetone trituration in the previous example (1.1 g.) on fluorosilicate (220 g.), eluting with benzene-methanol (19:1). Rechromatograph the early fractions on fluorosilicate (40 g.), eluting with ether. Triturate the solid with ether (2.0 ml.) to obtain the title compound (0.198 g.). Dissolve a sample (0.05 g.) in methanol (2.0 ml.), add water (2.0 ml.), cool to 0° C. and seed. Filter the precipitate and dry at 90° C./10⁻³cm. for 3 hours to obtain the pure title compound as hemimethanolate m.p. 154 –156 C. resolidifying and melting at 214.5°–2.5° C.

$C_{19}H_{26}O_4 \cdot \frac{1}{2}C_2H_5OH$ Calculated: C, 70.35; H, 8.56 percent
Found: C, 70.32; H, 8.57 percent.

DESCRIPTION OF THE PREFERRED EMBODIMENTS

The following examples illustrate the preparation of compositions of this invention. They are not to be construed to limit the scope thereof in any manner whatsoever.

EXAMPLE 1

A tablet for the use in inducing ovulation is prepared from the following ingredients:

| | |
|---|---|
| 13-Ethylgona-1,3,5(10)-triene-3β,16α, 17β-triol | 5 mg. |
| carboxymethylcellulose | 15 mg. |
| lactose powder | 25 mg. |
| redried corn starch | 25 mg. |
| magnesium stearate powder | 4 mg. |
| calcium silicate powder | q.s. |
| | 200 mg. |

The tablet is prepared by dissolving the steroid in benzene, mixing the solution with starch, drying the mix in a current of air, adding the remaining ingredients, mixing and compressing the composition into slugs. The slugs are regranulated and compressed into tablets, each containing 5 mg. of the active ingredient.

EXAMPLE 2

Tablets are prepared having the same composition as in example 1, except that na equal weight of the active ingredient of 13-ethyl-3-methoxygona-1,3,5(10)-triene-16α-17β-diol is substituted for 13-ehtylgona-1,3,5(10)-triene-3β,16α,17β-triol. The tablet is prepared by dissolving the steroid in benzene, mixing the solution with the lactose powder and drying the mix in a current of air, then adding the carboxymethylcellulose and half the starch. With the powder thus obtained is mixed starch paste prepared from the remainder of the starch, the mixture is wet-granulated, the granules dried, the stearate added and the composition compressed into tablets.

EXAMPLE 3

A capsule for use orally to induce ovulation contains, in encapsulating gelatin, the following ingredients:

| | |
|---|---|
| 13-Ethylgona-1,3,5(10)-triene-3β,16α,17β-triol | 5 mg. |
| finely divided silica lubricant | 5 mg. |
| magnesium stearate powder | 5 mg. |
| powdered corn starch | 113 mg. |
| lactose powder | q.s. |
| | 245 mg. |

EXAMPLE 4

Formulations for induction of ovulation are prepared in tablet form consisting of the following ingredients:

| | Mg. | | | | |
|---|---|---|---|---|---|
| 13-ethylgona-1,3,5(10)-triene-3β,16α,17β-triol | 0.05 | 1.0 | 5.0 | 10.0 | 20.0 |
| Microcrystalline cellulose, N.F. | 20.0 | 20.0 | 20.0 | 20.0 | 20.0 |
| Magnesium stearate, U.S.P. | 0.22 | 0.22 | 0.22 | 0.22 | 0.22 |
| Lactose, U.S.P., q.s. ad | 100.00 | 100.00 | 100.00 | 100.00 | 100.00 |

EXAMPLE 5

Tablets for inducing ovulation are formulated and prepared according to example 1, substituting for 13-ethylgona-1,3,5(10)-triene-3β,16α,17β-triol, respectively, an equivalent amount of the following compounds:

13β-ethyl-3-methoxygona-1,3,5(10)-trien-16α,17β-diol
13β-ethyl-3-methoxygona-1,3,5(10)-trien-16α-ol-17-one
13β-methyl-3-methoxygona-1,3,5(10)-trien-16α,17β-diol
13β-ethyl-17,17-ethylenedioxy-3-methoxygona-1,3,5(10)-trien-16α-ol
13β-ethylgona-1,3,5(10)-triene-3,11α,16α,17β-tetrol
13β-ethylgona-1,3,5(10)-trien-3,9α,16α,17β-tetrol Tablets for inducing ovulation are formulated and prepared according to example 4, substituting for 13-ethylgona-1,3,5(10)-triene-3β,16α17β-triol, respectively, an equivalent amount of the following compounds:

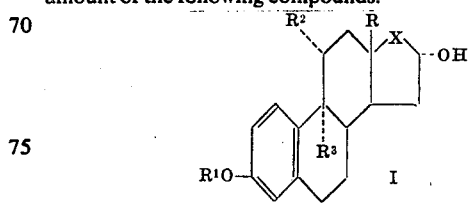

| R | R¹ | R² | R³ | X |
|---|---|---|---|---|
| CH₃CH₂ | H | H | H | CHOH |
| CH₃CH₂ | CH₃ | H | H | CHOH |
| CH₃CH₂ | CH₃ | H | H | C=O |
| CH₃CH₂ | CH₃ | H | H | C(O-)(O-) (ethylenedioxy) |
| CH₃CH₂ | H | OH | H | CHOH |
| CH₃CH₂ | H | H | OH | CHOH |

I claim:

1. A method of inducing ovulation in a warm-blooded anovulatory female vertebrate in which ovulation has been interrupted by an improper balance of pituitary hormones which comprises the administration thereto of an effective amount of an impeded steroidal estrogen 13-alkyl-16α-hydroxy-3,17-dioxygenated-gona-1,3,5(10)-triene and a pharmacologically acceptable carrier, the amount of said composition administered being at least sufficient to release sufficient endogenous circulating pituitary luteinizing gonadotrophins from the pituitary into the blood stream to provide a favorable environment to induce ovulation.

2. A method as defined in claim 1, wherein said composition is administered as a dosage unit comprising a major amount of a pharmacologically-acceptable carrier and from about 1.0 to about 200 mg. of said compound.

3. A method as defined in claim 1, wherein said compound is of the formula:

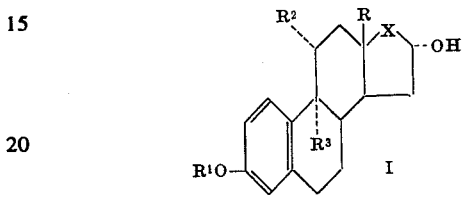

wherein R is (lower)alkyl;
R¹ is hydrogen or (lower)alkyl;
R² and R³ are hydrogen or hydroxy; and
X is carbonyl, hydroxymethylene or ethylenedioxymethylene.

4. A method as defined in claim 3, wherein in said compound R is ethyl, R¹, R² and R³ are hydrogen and X is hydroxymethylene.